United States Patent [19]
Axelrod et al.

[11] 3,824,021
[45] July 16, 1974

[54] REDUNDANT IMPERFECTION DETECTION SYSTEM FOR MATERIALS

[76] Inventors: Norman Nathan Axelrod, 809 S. Springfield Ave., Springfield, N.J. 07081; John David Greiman, 25 Woodland Dr., Woodcliff Lake, N.J. 07675

[22] Filed: June 14, 1973

[21] Appl. No.: 370,149

[52] U.S. Cl. ............... 356/200, 250/571, 250/227
[51] Int. Cl. .......................................... G01n 21/16
[58] Field of Search .......... 356/199, 200; 350/96 B; 250/219 DF, 227, 578, 571, 572

[56] References Cited
UNITED STATES PATENTS

| | | | |
|---|---|---|---|
| 3,331,963 | 7/1967 | Lippke | 356/200 |
| 3,566,083 | 2/1971 | McMillin | 350/96 B |
| 3,612,702 | 10/1971 | Troll | 356/200 |
| 3,744,905 | 7/1973 | Smith | 250/219 DF |

*Primary Examiner*—Vincent P. McGraw

[57] ABSTRACT

An optical inspection arrangement is organized to compare simultaneously corresponding unit sections of spaced linear widths of a material being transported along an axis. The resulting arrangement generates difference signals indicative only of imperfections. Variations due to patterns in the inspected material can be ignored thus leading to savings in information storage and processing costs.

13 Claims, 6 Drawing Figures

PATENTED JUL 16 1974

REDUNDANT IMPERFECTION DETECTION SYSTEM FOR MATERIALS

FIELD OF THE INVENTION

This invention relates to the detection and location of defects or imperfections in materials and more particularly to apparatus including scanning means adapted to locate imperfections in yard goods automatically.

BACKGROUND OF THE INVENTION

A number of optical arrangements exist for detecting imperfections in woven materials. Either a single or a plurality of sources of light are used along with a single or a plurality of photocells in a variety of systems. The photocell arrangement, in any case, is disposed to receive radiation reflected or transmitted through the material.

Familiar tradeoffs exist in the implementation of such imperfection detection systems in accordance with such prior art considerations. Generally, the narrower the spot on which a light source is focused, the more sensitive the system is to small imperfections. Also, the narrower the (lateral) sweep angle over which the light beam is scanned as the material is advanced, the less the signal distortion introduced by the changing area of material illuminated by the beam during each scan period. A narrow sweep angle is achieved by disposing the light source a distance from the material large compared to the lateral dimension to be scanned. But a large distance results in a relatively enlarged beam and a reduction in the sensitivity of the system. To compensate for this loss, the light source intensity is advantageously increased, or collimating lenses or optical fibers are employed, or multiple light sources are employed in parallel. Each option has its attending costs and limitations.

In one such system where multiple light sources are employed, a photocell is associated with each light source. This system requires additional sources, detectors, and electronic discriminators. Nevertheless, materials of arbitrary width can be scanned and the sensitivity of the system is also arbitrarily high.

In another system, a high intensity source such as a laser is employed. The laser may be positioned a considerable distance from the material with little enlargement of the beam and with little loss of efficiency. Moreover, the nature of the laser beam permits characteristic diffraction patterns to be generated by passing the laser beam through the material to be inspected. The diffracted beam is directed at a photographic film of a similar pattern generated for like material known to be free of imperfections. Changes in the diffraction pattern due to imperfections produce corresponding changes in the amounts of light passing through the mask to a photodetector. The laser beam is made to scan laterally with respect to the axis of material movement by known deflection means. Of course, lasers and suitable deflectors are expensive and the diffraction pattern can change even though no defects occur.

Although these various systems are useful in detecting isolated imperfections, they are not readily adaptable to the task of detecting variations in materials with repetitive patterns. Nor are they adaptable to variations in, for example, tightness of weave which need not be classed as defects.

BRIEF DESCRIPTION OF THE INVENTION

The present invention is based on the realization that first and second spaced apart linear arrays of photodetectors arranged to receive radiation reflected from or passed through material provide a flexible imperfection detection apparatus adaptable particularly to materials with repetitive patterns. The signals of corresponding detectors of the two arrays are compared to generate a difference signal when a difference therebetween occurs. Only when difference signals are generated by such a redundant system is it necessary to record (and process) the signals.

In an illustrative embodiment of the present invention, a redundant arrangement of at least two linear arrays of light collecting optical fibers are aligned laterally across the width of the material to be inspected. A single source of visible light is employed, in the embodiment, to illuminate the fibers (or light pipes). The fibers are arranged linearly in two banks at the light receiving end adjacent the material and light which is reflected from the material is transmitted along each fiber to an associated detector. The output signals of the corresponding detectors in the two banks are applied (in paris) to an associated comparator (viz: a differential amplifier) and the resulting outputs of the comparators are interrogated, for example, by a computer sequentially during each scan operation.

DETAILED DESCRIPTION

Figure 1:
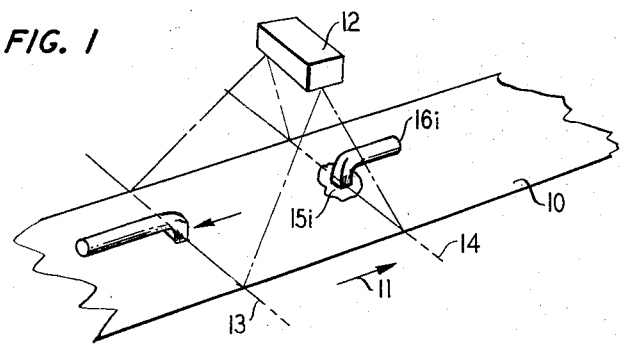
FIG. 1 is a schematic plan view of the optical arrangement of light generating apparatus and optical fiber light-reflection pick up apparatus arranged in two banks in an illustrative imperfection detection arrangement in accordance with an embodiment of this invention.

FIG. 1 shows a section 10 of a roll of material being transported through an inspection system. The material is assumed to be advancing in a direction indicated by arrow 11 in the figure. Any transport means is suitable for the advancement of the material. For textiles, playout and take-up rolls (not shown) are normally employed. The latter is driven, generally.

In the illustrative embodiment, light from a source 12 is directed at material 10 over an area bounded by imaginary broken lines 13 and 14 across at least a portion of the width of the material, but preferably across the entire width as shown in FIG. 1.

Light collecting optical fibers are positioned along lines 13 and 14 in a manner to receive light reflected from or passed through material 10. A reflective system is illustrated in FIG. 1. For an arbitrary width material which we assume to be 72 inches, 288 discrete optical fibers are employed each operating to scan an arbitrary width of ¼ inch (square) as the material is advanced.

Figure 2:
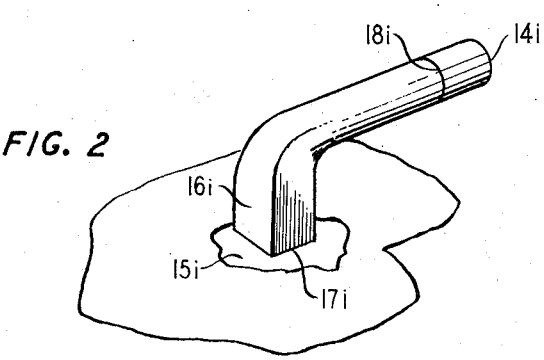
FIG. 2 is a schematic plan view of a representative optical fiber and associated light detector in the apparatus of FIG. 1.

FIG. 2 shows a representative optical fiber associated with an imaginary section 15i of material 10 (where $i$ is a dummy variable). An illustrative optical fiber (light pipe) is designated 16i in the figure. The fiber has a square cross section at an end 17i associated with the material and an opposite end 18i reduced in size and altered to a convenient shape (i.e., circular) to correspond with the size and shape of a photocell 14i.

Figure 3:
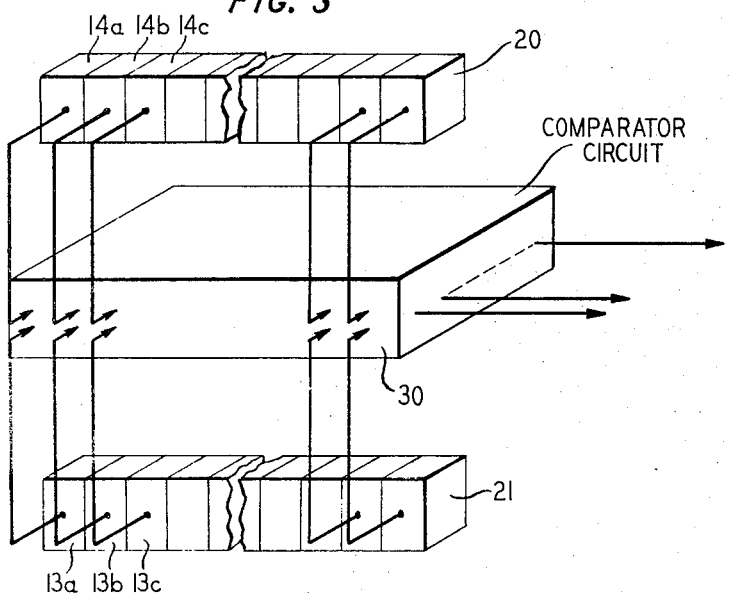
FIG. 3 is a schematic representation of the electronic organization of the detectors of FIGS. 1 and 2 for processing of the outputs thereof.

FIG. 3 shows a bank 20 of photocells 14i in a linear array extending laterally with respect to a longitudinal axis (11) along which movement of the material occurs. Bank 20 corresponds to broken line 14 of FIG. 1 and the associated cells are accordingly designated 14i. A second similar bank 21 corresponds to line 13 of FIG. 1 and the photocells associated with line 13 are similarly designated 13i. Photocells 13i and 14i are operative to amplify the light signals reflected from the surface of material 10 and to apply the output thereof to a comparator circuit 30 shown in FIG. 3.

A comparator circuit comprises, typically, a differential amplifier. In accordance with this invention, the signals from the corresponding cells of the banks associated with lines 13 and 14 of FIG. 1 are applied in pairs to first and second inputs of associated differential amplifiers. For example, photocells 13C and 14C are associated with one another in that the representative section 15i as it advances upward as indicated by arrow 11 in FIG. 1, first reflects light to photocell 13C and, at a prescribed later time (viz: during a different scan period) reflects light to photocell 14C. The photocells in the two banks of optical arrangements, thus, are organized in associated pairs to apply their outputs simultaneously to an associated differential amplifier during each scan period. The amplifiers are represented collectively as comparator circuit 30 in FIG. 3.

The outputs of comparator circuit 30, at any instant (scan period) in time, represent the imperfection profile of the linear width of material 10 being scanned by bank 20 compared to that being scanned simultaneously by bank 21. Each output of the comparator during a given scan period thus can be understood to represent the difference in the conditions of two scan areas (15) separated by an arbitrary distance along the (longitudinal) axis of movement.

Figure 4:
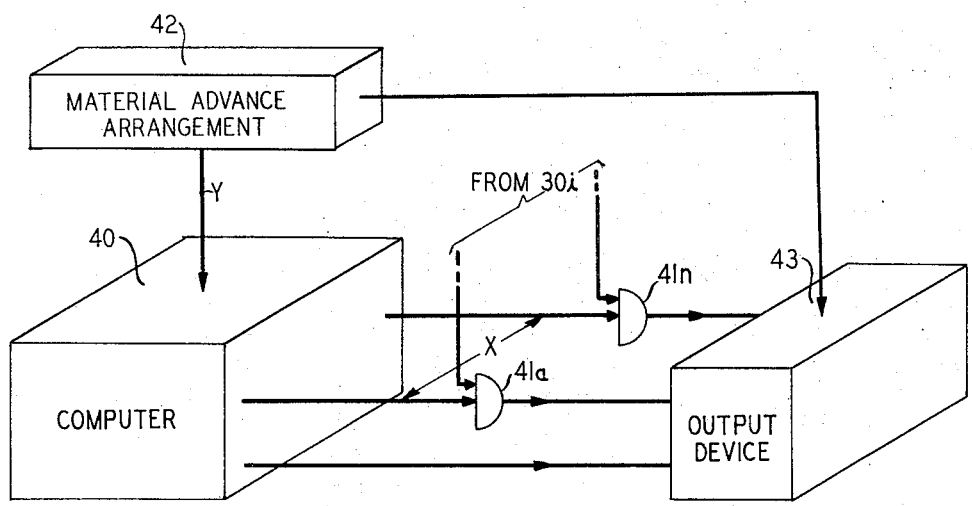
FIG. 4 is a schematic representation of the electronic control organization for the processing and recordation of the outputs of the detectors of FIG. 3.

A computer represented by block 40 in FIG. 4 is operative to interrogate sequentially the outputs of the comparator (see 30i of FIG. 3) by means, for example, of AND circuits 41i. Computer 40 is assumed to include a sequential switching device (not shown) operative to activate the AND circuits 41 sequentially to this end. Each AND circuit in turn applies a (null or a) coded difference signal to printout device 43 which is conveniently a magnetic tape device. Since each AND circuit and the associated amplifier corresponds to a position along the width of the material it supplies its X position automatically. Block 42 of FIG. 4 represents the material (10) advance arrangement, and is assumed to supply the Y position for each scan period.

Figure 5:
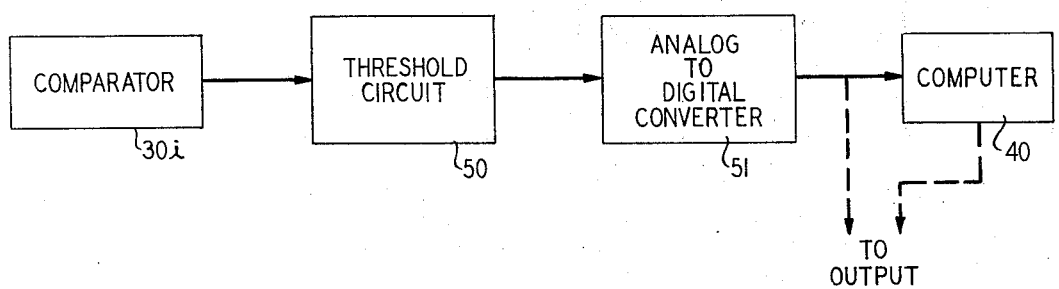
FIG. 5 is a schematic representation of the digital signal formation for the outputs of the detectors of FIG. 3.

In order to perform in this manner, the outputs of photocells 13i and 14i, which outputs are analog, are converted to digital information by an analog-to-digital converter. The comparator signals are considered to be applied to such a converter. The converter in response, is operative to provide a digital output with values of, for example, from 0 to 5 volts in suitable increments. The comparators apply their outputs to the converter through a variable threshold gate circuit which permits signals only outside of an acceptable voltage range to be applied to the converter. FIG. 5 shows a block diagram of a representative comparator (30i) applied to a threshold circuit 50 for control of the signal values applied to analog-to-digital converter 51. The resulting digital signals are applied to output device 43 via the AND circuits 41i. The signals can be applied directly to the output device or via the computer if complex information about the defects is required as will be discussed hereinafter.

We will now consider, the coded signals developed, the significance of those signals, the manner of controlling those signals, the dependency of the signals on the separation between the banks 20 and 21, how those signals are manipulated by a computer, the flexibility of such a redundant arrangement, and we will compare the arrangement with a nonredundant system in the inspection of materials with patterns and discuss alternative computer controls procedures.

Consider the movement of an imperfect area as it is advanced by the transport arrangement past the corresponding optical fibers of lines 13 and 14 in FIG. 1. As the imperfection passes an optical fiber or fiber bundle of line 13, it reflects, for example, a lower light level to the detector associated with the fiber. Assume that simultaneously a perfect section of material passes the associated cell of line 14. We will assume that the lower light level corresponds to a negative (i.e., less than an arbitrary zero) signal from the comparator. Similarly, a higher light level corresponds to a positive signal from the comparator. The comparator applies its outputs to a threshold circuit (50). The threshold circuit allows a signal to pass provided that its magnitude, independent of its sign, is larger than an arbitrary value depending upon the manufacturer's standards, the type of material, etc. This would prevent signal processing by the computer or by the analog circuits of low level noise signals. Later, when the imperfect area passes line 14, a second signal of opposite polarity is generated at the comparator. The result from a single imperfection, thus, is a sequence of two signals of opposite polarity (—+) or (+—) which are separated by a time proportional to the spacing between 13 and 14, and inversely proportional to the speed at which the material is being inspected.

If material 10 of FIG. 1 includes a pattern and if the repeat of that pattern is equal to the separation between banks 20 and 21 of FIG. 3, then the signals resulting from changes due to the pattern are eliminated. Consider, for example, that area 15i corresponds to a change in color due to design. In a prior art nonredundant system, such a change appears as a defect unless an auxiliary storage device stores the information relating to the pattern for continuous comparison as the material is advanced. On the other hand, in a redundant system in accordance with the present invention, no defect is indicated in this situation. Rather, like changes in color occur at corresponding inspected areas and both produce like inputs to the computer. The associated comparator circuit produces a null. Therefore, variations due to patterns require no storage and, even more important, require no processing.

If a defect is sufficiently wide to affect simultaneously more than one optical fiber (or fiber bundle) during each scan period, the fibers affected cause the associated detectors and comparator circuits to respond simultaneously to produce code sequences analogous to those described above for a single fiber. The resulting print out (tape) shows the width of the deflect as well as the length. The system is capable, therefore, of providing directly a "point count" in accordance with the accepted industry "Standards for Finished Knitted Fabrics" with straightforward computer processing. Computer 40 is considered operative to determine such point counts as is discussed further hereinafter.

It is to be appreciated that output signals may be applied to a printout device directly and that no computer storage is necessary for such an operation. For operation in this manner, the computer represented by block 40 may be omitted, only the clocking (sequential switching) function being performed thereby.

A like-operating prior art system would require computer storage however. A comparison with the storage requirements necessary to operate in a like manner with a single bank of detectors is helpful. For example, if the pattern repetition distance is 4 inches and the material 72 inches across, then there are the 288 units of information for one scan line (linear width) across the material. Also, there are 16¼ inch intervals in the assumed 4-inch repeat of the pattern. This gives a total of 4,608 addresses needed in memory at all times. Each address, in addition, typically stores a two or three words of data representing two or three significant figures in the measurement signal and the X and Y coordinates of the deflects. These storage needs correspond to 9,216 and to 13,824 storage positions, respectively. The use of the two banks of detectors, in accordance with this invention, eliminates this need for storage.

Also, by adjusting the threshold circuit (see 50 of FIG. 5), small changes due to variations in weave may be ignored. For example, a setting of the threshold circuit to pass signals outside of a preset voltage range inhibits the passage of signals within that range. If the range is set wider than that which corresponds to variations in weave per repeat, the variation is ignored.

In the above-described embodiment, a redundant system in accordance with this embodiment results in a direct recordation of defect profiles on an output device such as a tape. On the other hand, there is a decided advantage to employing a computer with a redundant system also. First, a sufficiently fast tape is relatively expensive ($17,000 with a controller) and even the fastest tapes available would allow inspection of probably less than fifty yards per minute. A computer on the other hand, allows inspection of at least 150 yards per minute. This rate corresponds to 103,648 signals per second for the system described. For a computer with a memory operating at say 960 nanoseconds, this leaves 10 memory cycles per period for processing. Further, if a read-only memory is employed, up to 18 memory cycles per period are available for processing. For a nonredundant prior art system, in contradistinction, processing of this type particularly to provide a point count (viz: defect extent both X and Y), a slow down of about a factor of two occurs in the inspection rate due to the need to process input information using a stored program. It should be clear at this juncture that a computer allows relatively fast transport rates, recording of defect positions for later automatic or semi-automatic control of salvage operations, and more sophisticated data processing for defect totals and thus for classification of materials when a redundant system is used.

The following table summarized the advantages of a redundant inspection system (with minimal computer processing) in accordance with this invention over a non-redundant prior art system:

| System | Storage Requirements | Processing Requirements | Inspection Rate | Capital Cost (Storage) |
|---|---|---|---|---|
| Non redundant | 9216 words or 13,824 words | 14 computer cycles per stored defect | 85 to 110 yards/min. | $ 7,960 or $11,888 |
| Redundant | 0 | 6 | 160 to 250 yards/min. | 0 |

The difference in the processing requirements is due to the fact that the computer in each of the nonredundant and the redundant systems performs the operations:

1. Accept interrupt signal from the comparator.
2. Read the X-address and voltage values, and
3. Read the Y-address from the material advance arrangement.

But the nonredundant system also has to perform the operations:

1. Read the stored values (in a table) for the corresponding point at the 4-inch interval.
2. Subtract values read from the values stored.
3. Test for result outside of established limits.
4. Store X and Y addresses and values if outside those limits.

If we assume a reasonable two cycles for the computer per step, the redundant system requires six cycles of operation and the nonredundant system requires 14 cycles as shown in the table.

There are a variety of methods for computer processing of the information provided by an inspection system in accordance with this invention. One method provides the simplest defect count. In this method, the computer converts each comparator output signal into a positive signal and adds the magnitude of the signal to the output signal. The result (when integrated) is a count equal to the number of positive output signals from the comparator. The computer divides this number by the number of yards scanned.

In another method, the comparator is operative as in the previous method and also is operative to integrate separately the signal between 0.1 and 1.0 volt and between 1.1 and 2.0 volts, for example. The result is a distribution function for the signal sizes. This result may be understood to provide the defect count by size of defect.

If a defect is less than the assumed ¼ inch in any major direction, the X and Y address of the defect is also supplied as described above. On the other hand, the defect may be longer than ¼ inch along the width of the material, along the length of the material, and/or along a diagonal. For the case where a line defect with a length parallel to the direction of movement of the material and longer than the separation between detector banks, the analog-to-digital converter (see FIG. 5) supplies (from comparator 30) a voltage and X address to the computer and the material advance arrangement (see FIG. 4) supplies the Y address during an initial scan period. The computer is operative to compare the voltage for the X address with the output for that address during the next subsequent scan period. The computer counts the number of times the comparator gives a voltage for that X address. At the scan period corresponding to the defect extending to the second bank of detectors, nulls are thereafter generated in the consecutive scan periods. When the defect ends, another imbalance in the system occurs and this imbalance becomes zero (produces a null from the comparator) when the defect clears the second detector bank.

If the line defect is parallel to the detector banks, the computer processes the information by comparing the signal from one pair of detectors with the signal from the adjacent pair of detectors in the same bank. If the adjacent pair is producing a null (viz: from the corresponding comparator), no further counting occurs. If both pairs of detectors provide a "non-null" signal, then the number of pairs of detectors producing a non-null signal is counted. The result is the extent of the defect parallel to the detector bank. The total integrated signal is indicative of the severity of the defect.

A long diagonal defect results in at least one defect count per scan period. The computer can count the number of detector pairs which give defect signals for each scan period. If at least one count is indicated in consecutive scan periods, a diagonal defect is indicated. This procedure can be further refined by comparing nearest neighbor detector pairs for consecutive scan periods as, for example, $X_i Y_i$ during one scan period with $X_{i+1}, Y_i$ or $X_{i+1}, Y_{i+1}$ in the next.

Figure 6:
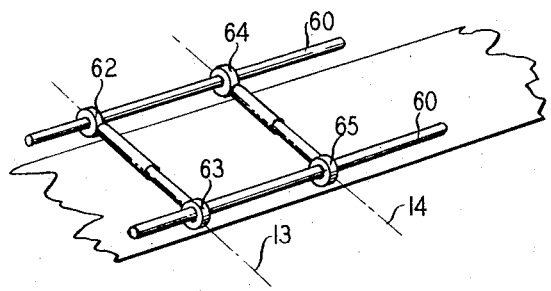
FIG. 6 is a schematic plan view of an illustrative mechanical-separation-adjustment mechanism for the two banks of optical fibers of FIG. 1.

The separation between banks of detectors is changeable in order to allow adjustment for different repeat patterns in fabric. A variety of implementations for so changing that separation is available. One implementation is illustrated in FIG. 6 where the banks of optics are arranged along adjustable supports aligned with lines 13 and 14 and extending between tracks 60 and 61. The banks are connected to the tracks by collars 62, 63, 64, and 65 which may, for example, be set manually and fixed in place by winged set screws.

A relatively low cost redundant arrangement in accordance with another embodiment of this invention employs a plurality of lenses to focus an illuminated image of the material on each detector rather than employing fibers. In this case as in the previous embodiment, for each scan period, the detectors are interrogated sequentially instead of employing optical beam scanning laterally across the material. The cost of sequential interrogation is less than that of optical scanning. Nevertheless, the invention can be practiced by employing optical scanning of two or more spaced linear widths of material for comparison.

Further, the circuitry for interrogating the sensing heads sequentially can be wired in a matrix to reduce costs. If, for example, we use the ¼ inch sensing heads across the width of the material and accept the 288 points are necessary for 72 inch width, 18 converters would be necessary to read all the points. The reason for this is that a typical analog-to-digital converter can interrogate 16 inputs (voltages) sequentially and convert the voltages to digital readings. On the other hand, the outputs of the sensing heads can be wired into a matrix of 18 rows and 16 columns. A stepping switch would then operate to sequentially activate the rows during a single scan period and the signals from the 16 columns would be applied a single converter sequentially.

It is to be understood that the invention has been described in terms of an illustrative arrangement where coded signals are applied to a printout device for evaluating the material inspected. Also, the coded signals may be applied to the transport arrangement for braking the movement of the material when a defect is found or recorded and later applied to a braking arrangement. A variety of additional options are available via the sophistication of computer control. The redundant system can also be advantageously employed with analog signal processing to avoid further the use of a stored signal and to avoid timing problems associated with storage when the system is to be used with patterns having different repeat distances.

What has been described is considered merely illustrative of the principles of this invention. Therefore, various embodiments can be devised by those skilled in the art in accordance with those principles within the spirit and scope of this invention as encompassed by the following claims.

What is claimed is:

1. An optical system for detecting imperfections in material having a longitudinal axis and a first width, first and second detector means spaced apart along said axis for generating simultaneously a plurality of light signals representative of imperfections in said material over first and second linear arrangements of unit width portions thereof, means responsive to said light signals for generating difference signals representative of the differences between corresponding ones of said light signals generated by said first and second means, means responsive to an external signal means for applying said difference signals sequentially to a utilization circuit.

2. An optical system in accordance with claim 1 also including means for transporting said material along said axis wherein said means for generating difference signals is responsive to consecutive external signals for so applying said difference signals to said utilization circuit.

3. An optical system in accordance with claim 2 wherein each of said first and second detector means comprises an optical arrangement for applying light reflected from associated ones of said portions.

4. An optical system in accordance with claim 3 wherein each of said first and second detector means comprises optical fibers arranged at first ends thereof along said first and second portions respectively and adapted at second ends thereof to apply light signals to associated photocells.

5. An optical system in accordance with claim 3 also comprising means for illuminating said material, said first ends of said optical fibers being arrayed to receive light reflected by said first and second arrangements of width portions of said material.

6. An optical system in accordance with claim 1 also including interrogation means for activating said means for generating said difference signal.

7. An optical system in accordance with claim 3 also including means for changing the separation between said first and second detector means along said axis.

8. An optical system in accordance with claim 1 wherein said utilization circuit comprises a threshold circuit for inhibiting difference signals of less than a threshold value.

9. An optical system in accordance with claim 8 also including an analog-to-digital converter connected to said threshold circuit wherein said converter is responsive to difference signals of above said threshold value for providing an output signal.

10. An optical system in accordance with claim 9 including an output device connected to said converter responsive to said output signal for providing an indication of said imperfections.

11. An arrangement for inspecting material having a linear width and being transported along a longitudinal axis, said arrangement comprising optical means for generating first and second signal sets associated ones of which are representative of corresponding sections of first and second linear arrangement of unit width portions of said material spaced apart from one another along said longitudinal axis, and comparison means responsive to consecutive scan signals and to associated ones of said first and second signal sets for generating difference signals therebetween representative of imperfections in consecutive ones of said linear arrangements.

12. An arrangement in accordance with claim 11 also including means for changing the spacing between said first and second arrangements.

13. An arrangement in accordance with claim 11 also including means responsive to ones of said difference signals in excess of a threshold value for recording indications of imperfections in said material.

* * * * *